(12) United States Patent
Guering (10) Patent No.: US 9,463,926 B2
(45) Date of Patent: Oct. 11, 2016

(54) AUTOMATED STORAGE CABINET FOR TROLLEYS, AND AIRCRAFT INCORPORATING SUCH A CABINET

(71) Applicant: Airbus Operations (SAS), Toulouse (FR)

(72) Inventor: Bernard Guering, Montrabe (FR)

(73) Assignee: Airbus Operations (S.A.S.), Toulouse (FR)

(*) Notice: Subject to any disclaimer, the term of this patent is extended or adjusted under 35 U.S.C. 154(b) by 461 days.

(21) Appl. No.: 13/772,726

(22) Filed: Feb. 21, 2013

(65) Prior Publication Data

US 2013/0259612 A1    Oct. 3, 2013

Related U.S. Application Data

(63) Continuation of application No. PCT/FR2011/000471, filed on Aug. 23, 2011.

(30) Foreign Application Priority Data

Aug. 24, 2010   (FR) ...................... 10 56733

(51) Int. Cl.
*B65G 1/06* (2006.01)
*B64D 9/00* (2006.01)
(Continued)

(52) U.S. Cl.
CPC . *B65G 1/06* (2013.01); *B64D 9/00* (2013.01); *B64D 11/0007* (2013.01); *B64D 11/04* (2013.01)

(58) Field of Classification Search
CPC .............................. B65G 1/06; B64D 11/0007

USPC ........................................................ 414/280
See application file for complete search history.

(56) References Cited

U.S. PATENT DOCUMENTS

| | | | |
|---|---|---|---|
| 5,074,496 A | 12/1991 | Rezag et al. | |
| 6,152,287 A * | 11/2000 | Luria | ......................... 198/465.1 |
| 6,663,043 B1 | 12/2003 | Luria | |

(Continued)

FOREIGN PATENT DOCUMENTS

| | | |
|---|---|---|
| CN | 101353106 A | 1/2009 |
| DE | 102 04 892 | 8/2003 |

(Continued)

OTHER PUBLICATIONS

International Search Report for Application No. PCT/FR2011/000471 dated Feb. 3, 2012. Chinese Office Action for Application No. 201180040605.8 dated Nov. 21, 2014.

(Continued)

*Primary Examiner* — Jonathan Snelting
(74) *Attorney, Agent, or Firm* — Jenkins, Wilson, Taylor & Hunt, P.A.

(57) ABSTRACT

The present invention relates to an automated storage cabinet for trolleys. It includes a device for automatically handling a single trolley with a handling basket including a vertical plate perpendicular to the waiting area, vertically movable between the floor of the waiting area and any one of the levels of the trolley storage cabinet, and two side flanks, connected to the vertical plate and provided with structure for supporting, on either side, two opposite sides of a trolley in the waiting area and for transferring the supported trolley through an opening of the predetermined compartment. The handling device can include structure for inserting the trolley into or extracting the trolley from the predetermined compartment.

11 Claims, 7 Drawing Sheets

(51) Int. Cl.
*B64D 11/04* (2006.01)
*B64D 11/00* (2006.01)

(56) References Cited

U.S. PATENT DOCUMENTS

| | | | |
|---|---|---|---|
| 6,923,612 B2 * | 8/2005 | Hansl | 414/277 |
| 7,331,544 B1 | 2/2008 | Harrington et al. | |
| 2005/0133308 A1 | 6/2005 | Reysa et al. | |
| 2006/0186268 A1 * | 8/2006 | Harrington et al. | 244/118.5 |
| 2007/0286711 A1 * | 12/2007 | Hashimoto et al. | 414/217 |
| 2008/0035792 A1 | 2/2008 | Harrington et al. | |
| 2009/0028675 A1 | 1/2009 | Tsujimoto et al. | |

FOREIGN PATENT DOCUMENTS

| | | |
|---|---|---|
| EP | 0443897 A1 | 8/1991 |
| FR | 2 228 688 | 12/1974 |
| GB | 2131779 A1 | 6/1984 |
| WO | WO 2008/070835 A1 | 6/2008 |
| WO | WO 2012/025673 | 3/2012 |

OTHER PUBLICATIONS

Chinese Search Report for Application No. 201180040605.8 dated Oct. 24, 2014.

* cited by examiner

AUTOMATED STORAGE CABINET FOR TROLLEYS, AND AIRCRAFT INCORPORATING SUCH A CABINET

CROSS-REFERENCE TO RELATED APPLICATIONS

This application is a continuation of PCT application serial No. PCT/FR2011/000471 filed Aug. 23, 2011, which claims priority to French Patent Application No. 1056733, filed Aug. 24, 2010, the entire contents of which are both incorporated by reference herein.

TECHNICAL FIELD

The present invention relates to an automated storage cabinet for trolleys. It also relates to an aircraft incorporating such a cabinet. It finds application in the fields of aircraft manufacture as well as the equipment of commercial aircraft.

BACKGROUND

In the state of the art, it is known to use kitchens or "galleys", in which a cabinet makes it possible to store trolleys which are intended for distributing drinks and refreshments as well as, if applicable, prepared meals in the aisle of an aeroplane of a passenger airline.

The meal distribution trolleys generally have a parallelepipedic shape. A meal distribution trolley runs on four wheels fixed to the base of the trolley. Handles allow the stewards and flight attendants to take the meals and refreshments to be distributed along the aisle between the rows of passenger seats.

Before this use, the trolleys are made up, for example in the air terminal, then stored in a hold, below the passenger deck. When the cabinet containing the trolleys is empty, new full trolleys are inserted, which are subsequently distributed during the flight.

In order to carry out this loading procedure, it is known to use a kind of lift, passing through the floor of the passenger deck, and making it possible to take one or more meal distribution trolleys from the hold to the cabin or passenger deck. The trolleys awaiting distribution are then stored in a trolley storage cabinet on a single level, at the level of the floor of the cabin. The used trolleys are then taken down into the hold by reversing the operation.

Such a state of the art is for example represented by the documents EP-A-0443897, GB-A-2.131.779, US2006/0186268. It has in particular the drawback of requiring a hole to be made through the floor of the passenger deck, which weakens its structure, unless it is reinforced with an additional special arrangement.

In another state of the art, it is known to use trolley storage cabinets comprising at least two superimposed levels of trolley storage drawers. Particularly in order to access the trolleys stored on the upper level above the floor of the cabin, a horizontal platform is used, which is then raised to the desired level in order to extract one or more trolleys from, or introduce one or more trolleys into, the storage compartment.

Such a state of the art is in particular presented by the document WO 2008/070835. However, this state of the art does not make it possible to load a drawer on a higher level with a trolley if this drawer is not situated close to a side pillar which serves as a lift. A situation of this kind is also represented by the document US2005/0133308.

It is not possible to access a particular trolley in this way. Moreover such a solution has a particularly high space requirement since an area has to be reserved in the meal distribution trolley storage cabinet in order to arrange therein the lift which makes it possible to access a single upper level.

Moreover, the use of a horizontal lifting platform as lift, especially in the case where several trolleys have to be lifted at the same time, can result in bending of the horizontal platform and also result in sagging of the cabinet itself.

SUMMARY

The present invention remedies at least one of the drawbacks of this state of the art. In fact, the present invention relates to an automated trolley storage cabinet in a supporting structure, said trolley storage cabinet comprising at least two levels of compartments each intended for storing a trolley, characterized in that it comprises in particular a device for automatically handling a single trolley between:

a waiting area, arranged on a floor of the supporting structure and adjacent to openings of trolley storage compartments of said trolley storage cabinet, and a predetermined compartment at a predetermined level of the trolley storage cabinet, the handling device comprising a handling basket comprising:

a vertical plate perpendicular to the waiting area, vertically movable between the floor of the waiting area and any one of the levels of the trolley storage cabinet, and two side flanks, firmly fixed to the vertical plate and provided with means for supporting, on either side, two opposite sides of a trolley in the waiting area and for transferring the supported trolley through an opening of the predetermined compartment, the vertical plate bearing motor means for producing a relative lateral displacement of the two side flanks, the handling device being provided with means for inserting the trolley into or extracting it from the predetermined compartment.

An advantage of this arrangement is that it allows access to any compartment of the storage cabinet at any level in the cabinet. Furthermore, it is also possible to use the entire volume of the storage cabinet to store trolleys therein (for example meal distribution trolleys), the handling mechanism being completely outside the volume of the cabinet, even during the insertion and/or the extraction.

Finally, the relative lateral displacement of the side flanks makes it possible to adapt to the different trolley dimensions. An advantage of this arrangement is that it makes it possible, by gripping the side flanks, to ensure a perfect alignment of the meal distribution trolley with respect to a longitudinal dimension of the destination compartment which serves as the insertion and/or extraction direction.

According to other advantageous characteristics:

the vertical plate is mounted on motor means and configured in order to confer a vertical movement on the vertical plate;

the vertical plate bears motor means for producing a displacement of both side flanks together;

the means for transferring the supported trolley through an opening of the predetermined compartment comprise motor means for allowing the transfer of the trolley between a position situated between the side flanks and the predetermined compartment or vice versa;

the motor means are actuated under the control of a control unit cooperating with sensors of the displacement of moving parts and means of control in particular for selecting a predetermined compartment;

the motor means of vertical movement of the vertical plate are duplicated on each side of the vertical plate in such a way that the control unit connected to horizontality sensors of the trolley controls said horizontality; an advantage of this arrangement is that it makes it possible to control the horizontality at least in the direction perpendicular to the direction of insertion and/or extraction of the trolley, which improves the balance of the handling device;

the means for supporting, on either side, two opposite sides of a trolley comprise a plurality of removable stops, each removable stop being driven by a motor and being mobilized by the control unit in order to come into position under the base of the trolley during the greater part of the transfer of the trolley between the waiting area and the predetermined compartment; an advantage of this arrangement is that it makes it possible to transfer the weight of the trolley on the two side flanks while ensuring the passage of parts projecting from the base of trolley such as the wheels during the movements of insertion into and/or extraction from a predetermined compartment;

the means for transferring the supported trolley through an opening of the predetermined compartment also comprise a device for pushing or extracting a trolley through the opening of said predetermined compartment; an advantage of this arrangement is that it makes it possible to avoid the side flanks of the handling basket entering into the compartment in order to completely insert the whole trolley into it, which would increase the width of the compartment by at least the thickness of each of the side flanks. Furthermore, it is possible to push the front face of the trolley as far as necessary through the opening of the chosen compartment, by calculating the extension of the pusher-extractor device;

the side flanks comprise edges intended to fit parts opposite walls of the predetermined compartment, each edge comprising a centring means intended to engage with a suitable profile of said part of wall opposite the predetermined compartment; an advantage of this arrangement is that it ensures the centring of the handling basket on the compartment chosen for the insertion and/or extraction of the trolley while ensuring the continuity between the handling basket and the compartment during this handling;

the automated cabinet comprises a means for projecting onto the floor an image of a mark for alignment of a trolley in the waiting area under the control of the control unit, the alignment of the trolley facilitating the positioning of the handling basket around the trolley; an advantage of this arrangement is that it makes it possible to mark by program any part of the waiting area and thus to ensure an aid for aligning two edges of the trolley before it is gripped by the two flanks of the handling basket, these two flanks achieving its alignment in order to allow its insertion into a compartment of the storage cabinet, which allows tighter dimensions of the compartment around the trolley;

the automated cabinet comprises at least one roller mechanism for a flexible wall rolled up on either side of at least one level of compartments of the cabinet; an advantage of this arrangement is that it ensures that at least one of the levels of the storage cabinet is kept cold while arranging an access door to the predetermined compartment when a trolley is to be inserted or extracted;

the automated cabinet comprises at least one stiffening rod; an advantage of this arrangement is that it increases the rigidity of the supporting structure with the aid of that of the storage cabinet, while making it possible to reduce the quantity of material and therefore the dimensions of the cabinet for a given number of trolleys. The rod also makes it possible to add rigidity without increasing the dimensions of the cabinet.

According to another aspect of the invention, the invention relates to an assembly comprising a floor of a supporting structure of a cabinet and an automated cabinet according to the invention According to another aspect of the invention, the invention relates to an aircraft incorporating at least one automated trolley storage cabinet of an aircraft according to the invention, the trolleys being for example aircraft cabin galley trolleys.

It will be noted that the handling device according to the invention can be used for handling other types of trolleys or removable containers intended to be arranged in a cabinet with compartments.

Among other technical characteristics of the present invention, the following points are noted:

the removable stops of the means for supporting, on either side, two opposite sides of the trolley comprise roller levers and/or deformable parallelograms with bars;

the pusher-extractor device comprises a deformable parallelogram;

the deformable parallelogram of the pusher-extractor device cooperates with a key intended to engage with a part projecting from the trolley at least during a phase of extraction of the trolley through the opening of the compartment under the action of motor means controlled by said control unit;

the roller mechanism for a flexible wall is such that the flexible wall is made of a thermally insulating material and closes the openings of the compartments of said level;

the flexible wall comprising at least one opening which is displaced by a motor connected to the roller mechanism under the control of the control unit so that a predetermined compartment is accessible through said opening;

the stiffening rod comprises a tube with a rectangular cross-section, firmly fixed to a side wall of the cabinet by bearings of low-friction material, and anchored to the floor and to the ceiling of the supporting structure of the cabinet so as to stiffen said structure.

BRIEF DESCRIPTION OF THE DRAWINGS

Other characteristics and advantages of the present invention will be better understood with the help of the description and attached figures in which.

Figure 1:
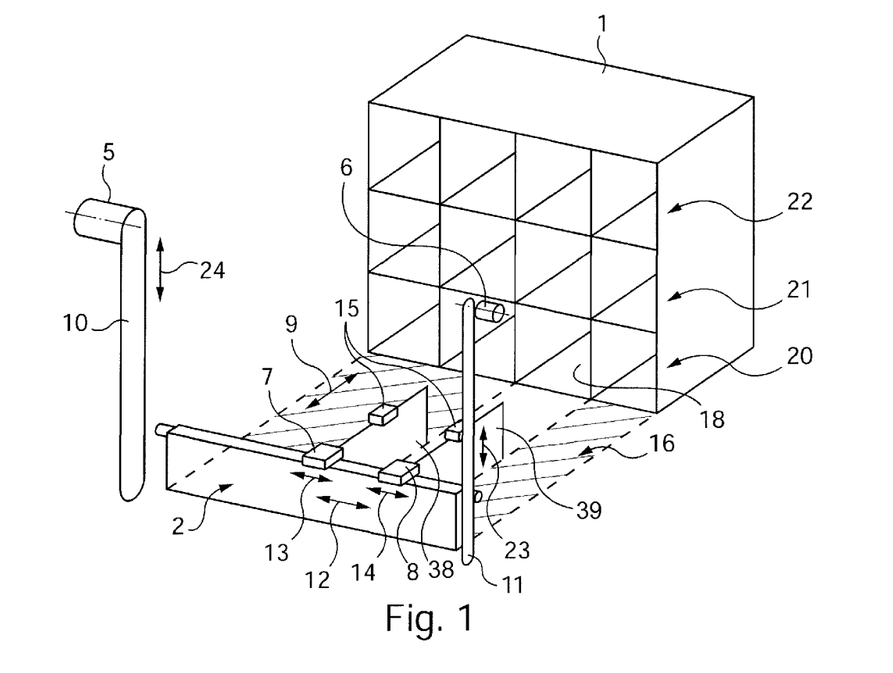
FIG. 1 is a diagrammatic perspective view of an automated cabinet in a preferred embodiment of the present invention.

In FIG. 1, the automated trolley storage cabinet of the invention is diagrammatically represented under reference 1.

DETAILED DESCRIPTION

Figure 22:
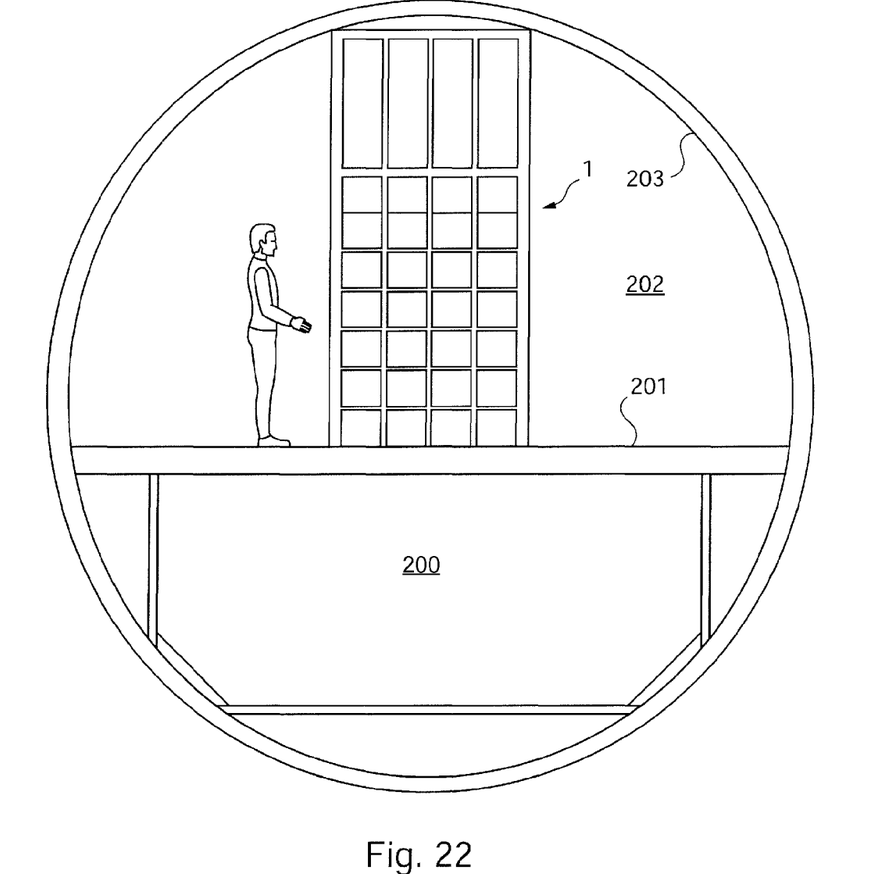
FIG. 22 is a location plan of an automated cabinet according to the invention in an airliner.

In FIG. 22, the automated trolley storage cabinet 1 is shown in a cross-section of the fuselage of an airliner. It is set up on a hard surface 201, separating a hold 200 from a passenger cabin 202. The automated cabinet 1 extends up to the roof section 203 of the cabin 202 and it is dimensioned so as to optimize the occupation of the volume available in the cabin. In practice, the fuselage of the aircraft serves as supporting structure for the automated trolley storage cabinet. It is understood that such a cabinet can be mounted on other supporting structures, such as the hold of an aircraft, the cabin of a railway wagon, a salon of a cruise ship, or any other vehicle.

Such a cabinet is arranged for example in a cabin galley of an aircraft. Again with reference to FIG. 1, the trolley storage cabinet 1 has at least three levels 20-22 of compartments in each of which a trolley is intended to be arranged as described previously.

The automated cabinet of the invention comprises in particular a device for automatically handling a single trolley. The automatic handling provided by the invention essentially consists of transferring a predetermined trolley between a waiting area 16 arranged on the floor of the cabin of the aircraft and the opening of a compartment such as the compartment 18 at the level 20 of the trolley storage cabinet. The waiting area 16 is intended to receive at least one trolley when it is to be loaded into a compartment or also before it is taken by a steward in order to serve meals and refreshments in an aisle of the aeroplane via one of the right or left edges of the waiting area 16. The device for automatically handling a single trolley comprises a handling basket mainly comprising a vertical plate 2 bearing two side flanks, 38 and 39 respectively.

The vertical plate 2 is perpendicular to the waiting area 16 and for example has a substantially rectangular shape having a long horizontal dimension and a short vertical dimension. The vertical plate is vertically movable, because it is mounted on motor means 5, 6 arranged for example in the vicinity of the waiting area on the other side of the cabinet 1. In a preferred embodiment, the motor means 5, 6 of the vertical plate 2, vertically driving the vertical plate 2, are arranged on either side of the vertical plate 2. They comprise an endless chain 10 mounted between the ceiling and the floor of the cabin to the left of the vertical plate and an endless chain 11 mounted between the ceiling and the floor of the cabin and arranged to the right of the vertical plate 2.

In a particular embodiment which will be described in more detail below, the vertical plate 2 makes it possible to control the horizontal direction of a trolley which is firmly fixed, as will be described below, to the vertical plate by making the two endless chains 10 and 11 work differentially according to the respective vertical movements 23 and 24. To this end, the motor means 5 and 6 are independently controlled by the control unit of the automatic handling device, which will be described below. Each motor 5 or 6 receives a command from the control unit at different speeds thus ensuring a rapid return to the horizontal condition of the meal distribution trolley.

The vertical plate 2 also bears two side flanks 38 and 39 which are intended to grip a meal distribution trolley, arranged in the waiting area, in order to then transfer it from the waiting area 16 to a predetermined compartment of a predetermined level 20-22 in the trolley storage cabinet 1. To this end, each side flank 3 or 4 is firmly fixed to the vertical plate 2. Each side flank 38 or 39 is driven by motor means 7, 8 firmly fixed to the vertical plate and comprising a motor mounted on a carriage movable on a rack or rail of the vertical plate. Thus, it is possible to displace each of the side flanks along the horizontal dimension of the vertical plate 2, in independent manner horizontally according to the movements 13 and 14. The automatic handling device of the invention is therefore capable of covering the entire volume comprised above the waiting area 16. Preferentially, the side flanks 38 and 39 extend longitudinally from the vertical plate 2 as far as the front faces of the compartments of the trolley storage cabinet 1.

Each side flank 38 or 39 also bears motor means 15 which are removably connected to the meal distribution trolley being handled by a trolley pusher and/or extractor device according to the movement 9.

A description will now be given of a scenario of loading a meal distribution trolley from the waiting area to a compartment of the trolley storage cabinet 1.

When a trolley (not shown) is detected in the waiting area 16, a control unit (not shown in FIG. 1) controls the motor means of the single-trolley automatic handling device so that the vertical plate 2 descends from a parked or resting position (not shown in FIG. 1) down to a low position while moving each side flank 38 or 39 towards one of the two opposite sides of the meal distribution trolley.

Once the flanks 38 and 39 are arranged on either side of the side walls of the trolley and are in contact with these, the control unit actuates a movement of gripping the flanks so that the trolley is then oriented parallel to the greatest dimension (e.g. the depth) of a compartment into which it is to be loaded (the trolley is oriented in the direction of the longitudinal extension of the flanks). In a subsequent step, the vertical plate is raised when actuated by the control unit (not shown) of the automatic handling device of the invention up to the desired level 20-22. The motor means 7 and 8 of the side flanks 38 and 39 are then actuated simultaneously so as to displace the trolley sideways according to the movement 12 and position it in front of the opening of the predetermined compartment 18 into which it is to be inserted.

Finally, in a last step, the trolley transfer motor means, such as the motor means 15 on the flank 38, are actuated by the control unit of the automatic handling device of the invention, so as to push the meal distribution trolley inside the compartment. The handling basket of the automatic handling device can then return to the parked position.

The procedure for extraction of a meal distribution trolley from a predetermined compartment in a predetermined level 20-22 of the trolley storage cabinet 1 is the strict reverse of the insertion procedure which has just been described and will not be described further.

It will be noted that, during the horizontal translational movement 12 of the two flanks so as to bring the trolley in front of the opening of a predetermined compartment, the gripping of the flanks is constantly controlled by the control unit of the handling device of the invention.

It is also noted, as discussed in more detail below, that all of the movements are monitored using a network of displacement sensors so as to ensure that the meal distribution trolley is presented precisely in the axis of the opening of the predetermined compartment at the predetermined level.

Figure 2:
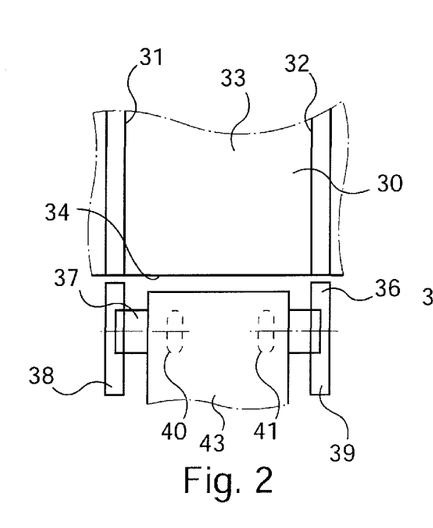
FIGS. 2 to 6 are execution details of parts of the cabinet of FIG. 1.

FIG. 2 shows the end of the approach of a handling basket bearing a meal distribution trolley 43, partially showing a left side flank 38 and a right side flank 39 gripping the trolley. The basket thus constituted has been moved towards the front face 34 of a chosen compartment 30 on a predetermined level of the storage cabinet. The compartment 30 is limited in particular by a base wall 33 and two side walls 31 and 32 which separate the compartment 30 from its neighbours in the same level of the trolley storage cabinet. The two side walls and the base wall (as well as the top wall not shown in this figure but which is parallel to the base wall) define the longitudinal dimension (depth) of the compartment.

The meal distribution trolley has castors such as the wheels 40 and 41 (in dotted lines) under the base of the trolley, which are intended to run on the base 33 of the compartment.

It is noted that the automatic handling device is programmed so as to arrange the ends of the left flank 38 and of the right flank 39 precisely in continuity with the side walls 31 and 32 of the compartment (in alignment with their respective longitudinal directions). It is thus possible to limit the internal width of each compartment to the width of the trolley, within tolerances.

The left 38 and right 39 side flanks have means for translational movement of the trolley to the compartment. In an embodiment, the means for translational movement or transfer of the meal distribution trolley in the side flanks comprise, for the right flank 39, a rack 36 and, shown on the left flank 38, a movable carriage 37. The movable carriage 37 is of course duplicated on the right side flank 39 and enters into its own rack on the inner surface of the left side flank 38.

When the automatic handling device of the invention actuates the insertion of the trolley through the front face 34 of the compartment 30, the electric motor of each movable carriage such as the carriage 37 is actuated so that the meal distribution trolley 43 is inserted through the front face 34 of the compartment 30.

During extraction, the same movement is actuated in reverse, each carriage such as the movable carriage 37 performing a reversed movement.

Sensors (not shown in FIG. 2) are provided and make it possible to detect:

the alignment of the left 38 and right 39 side flanks side flanks with the side walls 31 and 32 of the compartment 30;

the end of travel of the meal distribution trolley 43 inside the compartment 30 or inside the handling basket comprising the left 38 and right 39 side flanks.

Figure 3:
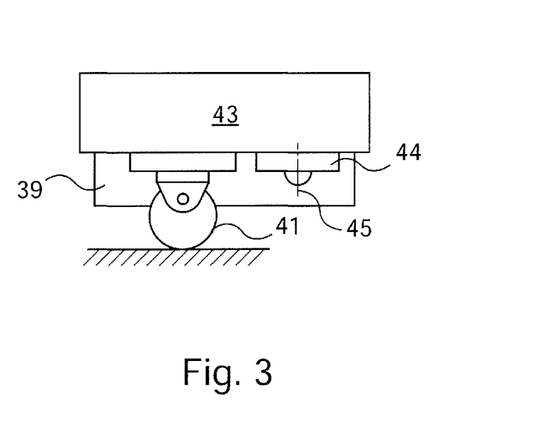

FIG. 3 diagrammatically shows an arrangement complementary to the handling basket shown in FIG. 2. The meal distribution trolley 43 is gripped between the side flanks, only the side flank 39 of which has been shown for the sake of simplicity. The base of the trolley F bears in particular a wheel or castor 41 and the side flank 39 bears, on its face inside the handling basket, an axis of retraction 45 of a stop 44. The stop 44 is retracted by a motor means, such as a cylinder, in particular in order to allow the wheel 41 to pass through during the insertion or extraction of the meal distribution trolley 43 through the open front face of the compartment. The motor means for retraction of a stop such as 44 can be actuated by the control unit of the automatic handling device of the invention. The stop makes it possible to support the weight of the meal distribution trolley 43 in the handling basket, when the right and left flanks are gripped around it. Several retractable stops such as the stop 44 are arranged along each side flank such as the right side flank 39. In a particular embodiment, the stop 44 bears a roller intended to roll under the base of the trolley F in order to facilitate the transfers of the meal distribution trolley in the handling basket.

Figure 4:
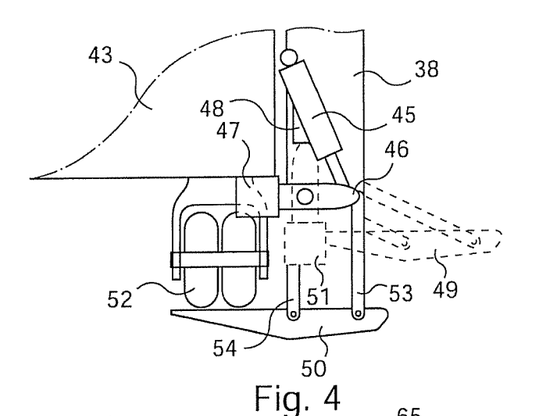

FIG. 4 shows another embodiment of an arrangement shown in FIG. 2 and in FIG. 3. The meal distribution trolley 43 is partially represented with a double castor 52, mounted on its base F. At least three other castors (not shown) are arranged at the other corners of the meal distribution trolley with a substantially rectangular cross-section. The handling basket, gripping the meal distribution trolley, comprises the right and left side flanks, of which only the left side flank 38 is shown. A stop, comprising an articulated lever 46 and a castor 47, is shown fitted to the base F of the trolley. The articulation of the castor is firmly fixed to the side flank 38 and is mobilized by a cylinder 45 which can be actuated under the action of the control unit of the automatic handling device of the invention. When the castor 47 is retracted, it passes into the vertical position 51, shown in FIG. 4.

According to another arrangement, also shown in FIG. 4 and which may or may not be combined with the castor 47, a deformable parallelogram 49; 50 is provided and is intended to raise the wheels 52 of the trolley and to support them throughout the period when the meal distribution trolley is situated inside the handling basket, constituted in particular by the two right 39 and left 38 side flanks. To this end, the deformable parallelogram, shown in solid lines in the deployed position 50, comprises bars 53 and 54 articulated on a running surface 50 and which are mobilized by a cylinder partially represented as 48 in FIG. 4. When the cylinder 48, actuated by the control unit of the automatic handling device of the invention, is deployed, the deformable parallelogram passes from the retracted position 49 (shown in dashed lines) to the deployed position 50 in which the wheels 52 are raised above the ground. The meal distribution trolley 43 is then supported in the handling basket, in particular using the parallelogram in position 50 until it touches the floor of the cabin or the base of a compartment of the storage cabinet of the invention.

Figure 5:
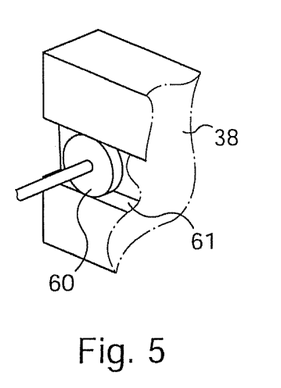

FIG. 5 shows another arrangement making it possible to ensure the insertion or the extraction of the meal distribution trolley vis-à-vis the basket constituted in particular by the right and left flanks to the compartment in the storage cabinet or vice versa. Each right or left side flank, such as the flank 38 partially represented in FIG. 5, comprises a rack on its inner surface 61 and which is intended to receive a gear wheel 60 driven by a motor connected to a movable carriage. The movable carriage, not shown in FIG. 5, cooperates with a pusher and/or extractor device in relation with the actual meal distribution trolley. The movable carriage on the right and/or left side flank can be controlled by the action of the control unit of the automatic handling device of the invention.

Figure 6:
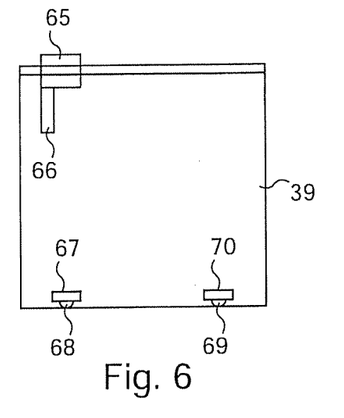

FIG. 6 shows a diagrammatic view of the side flank 39 of FIG. 5. A motorized trolley 65, firmly fixed to the rack 61, drives the pusher and/or extractor device 66 linked to the meal distribution trolley (not shown in FIG. 6). The inner surface of the side flank 39 also bears two stops 67 and 70 respectively mounted on pivots 68 and 69 as means for supporting, on either side, two opposite sides of a meal distribution trolley.

When the meal distribution trolley to be inserted into or extracted from a compartment is arranged between the flanks of the handling basket, such as the side flank 39 (FIG. 6), the pusher-extractor device 66 linked to the meal distribution trolley is driven from right to left or from left to right so as to drive the meal distribution trolley from the compartment to the handling basket or from the handling basket to the compartment.

Figure 7:
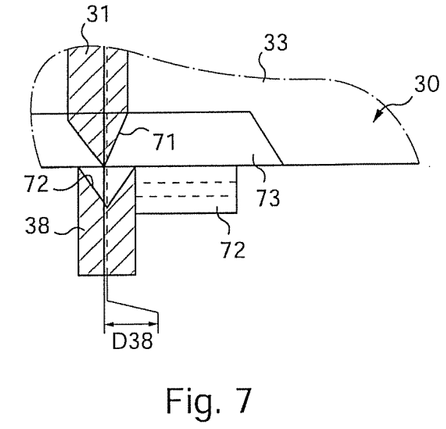
FIGS. 7 to 9 are diagrammatic views of arrangements ensuring the centring of the handling basket on a compartment.
Figure 8:
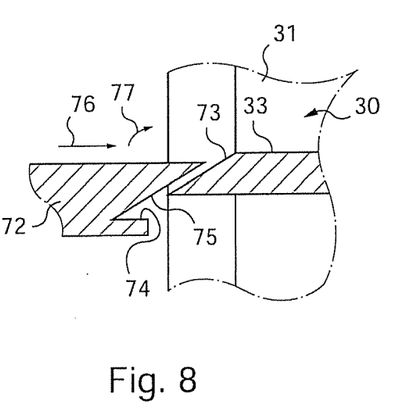

FIGS. 7 and 8 show an arrangement making it possible to ensure that the flank 38 is brought into contact with the corresponding side wall 31 of the compartment 30 during the approach of the handling basket. As the basket is composed of two left 38 and right 39 side flanks, the same arrangement is provided for the right side flank 39 which is not shown in FIGS. 7 and 8. FIG. 7 shows the end of the left side flank 38 during its phase of approaching the compartment 30. The compartment 30 has a side wall 31 separating it from the neighbouring compartment and the edge of which on the side of the front face 34 has a wedge-shaped or bevel section 71. The bevel 71 is intended to penetrate a dihedron formed on at least one part of the lateral edge of the flank 38 facing the wall 31. As the axes of the bevel 71 and of the dihedron are not perfectly aligned (gap denoted D38), the contact of the bevel 71 with one of the flanks of the dihedron corrects the alignment of the assembly (lateral self-alignment of the basket and the compartment). Similarly, the left side flank 38 bears an angle 72 which is intended to fit into a bevel 73 arranged on the lower surface or wall 33 of the compartment 30 close to the separating wall 31.

FIG. 8 shows the situation of the approach of the basket in which the angle 72 has an inclined part which connects to a lug 74. The inclined part 75 is intended to slide over the bevel 73 of the edge of the base wall 33 of the compartment 30. During the approach 76, when the bevel 73 meets the inclined part 75, a movement of alignment 77 makes it possible to bring the handling basket level with the base 33 of the compartment (vertical self-alignment of the basket and the compartment). It will be noted that other means of lateral and/or vertical self-alignment of the basket and of a compartment can be envisaged.

Figure 9:
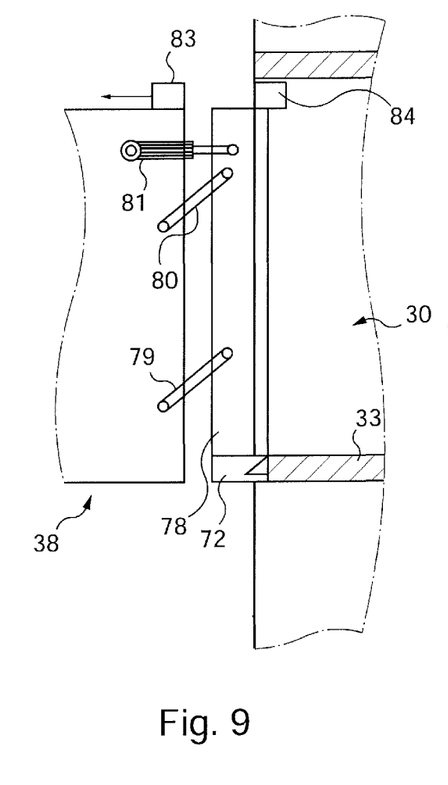

In these arrangements of FIGS. 7 and 8, the vertical plate of the handling basket of the automatic handling device (not shown in FIGS. 7 and 8) allows the driving in correspondence of the two side flanks of the basket towards the corresponding walls of the destination compartment 30. However, the rigidity of the assembly involves the arrangement of a certain mechanical operating clearance making it possible to overcome misalignments such as the misalignment D38 in FIG. 7 or that visible on the angle 72 with the base 33 in FIG. 8. In order to avoid having to resort to clearances, the arrangement in FIG. 9 uses a bar 78 mounted in the form of a parallelogram deformable using articulated bars 79 and 80 and a mobilization cylinder 81 with the corresponding edge of the side flank 38 shown. During the approach, sensors 83 and 84 make it possible to detect the juxtaposition of the basket with the compartment 30. At a predetermined detection signal, the automatic handling device, via a control unit provided for this purpose, issues a command activating the cylinder 81 and the bar 78 which bears the dihedron and the angle 72 is simultaneously applied to the side wall 31 and the base 33 of the compartment 30.

Figure 10:
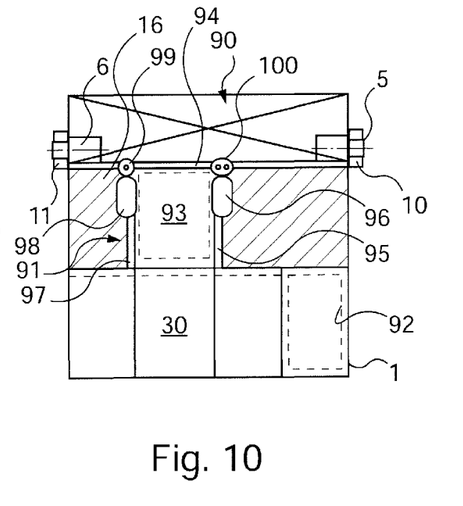
FIGS. 10 and 11 are respectively a diagrammatic top view of a particular embodiment of an automated cabinet according to the invention and a diagrammatic perspective view of an arrangement used in FIG. 10.

FIG. 10 shows a top view of another embodiment of a cabinet for storing trolleys (for example trolleys according to the invention) incorporating an automated handling device for meal distribution trolleys. The automated handling device comprises a handling basket 91 which is mounted on vertical translational movement means 6, 11 and 5, 10 to the left and to the right respectively of a cabinet 90 (for example, a galley cabinet). The cabinet 90 is arranged on one side of a waiting area 16 the opposite side of which is bordered by the trolley storage cabinet 1. The trolley storage cabinet comprises compartments, such as the compartment 30, distributed on different levels and a meal distribution trolley 92 is shown stored inside the compartment furthest to the right (FIG. 10).

The handling basket 91 comprises mainly the vertical plate 94 mounted on the vertical displacement motor means 6, 11 and 5, 10, and two side flanks 95 and 97 respectively. The side flanks 95 and 97 ensure the two functions of laterally transporting the meal distribution trolley 93 above the waiting area 16 and gripping the trolley 93. Moreover, once the flanks have been arranged on either side of the trolley 93 the handling basket is transferred under the actuation of the control unit of the handling device of the invention to the front face opening of a predetermined compartment at a predetermined level of the trolley storage cabinet. To this end, the side flank 97 is driven by a horizontal translational movement motor means 99 on the vertical plate 94 and bears a drive carriage for insertion and of extraction 98 of the trolley 93. The side flank 95 is driven by a horizontal translational movement motor means 100 on the vertical plate 94 and bears a drive carriage 96 for insertion and extraction of the trolley 93 vis-à-vis the compartment 30.

In an embodiment example, the cabinet 90 is a galley cabinet incorporating the vertical motor means 6, 11 and 5, 10. The cabinet 90 has a work surface, not shown, as well as storage shelves which make it possible to prepare refreshments to be loaded into the meal distribution trolley 93.

Figure 11:
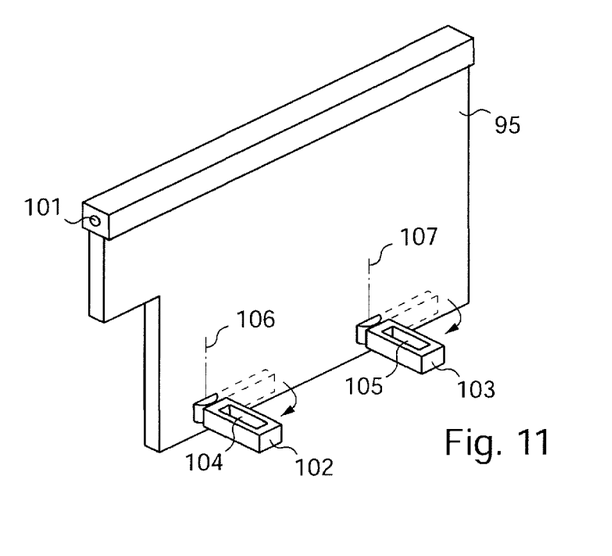

FIG. 11 shows another view of a side flank, such as the side flank 95, on the side of its face inside the basket 91. The side flank 95 bears a rail 101 on which drive carriage will be mounted such as the carriage 96 which is not shown for the sake of simplicity. Moreover, two retractable movable stops 102 and 103 are shown in the deployed position of support of the base of the trolley when the side flank is arranged on one side of the trolley 93 in FIG. 10. Each stop comprises a guide roller 104 on the stop 102 and a guide roller 105 on the stop 103. A vertical axis, such as the axis 106 for the stop 102 and the axis 107 for the stop 103, provided with motorization by a controllable cylinder allows the retraction of each of the stops into the position indicated in dotted lines. Particularly, each stop can be arranged in front of a wheel equipping the base of the trolley. When the insertion or the extraction of the meal distribution trolley vis-à-vis the compartment 30 takes place, this must be synchronized with the retraction of the stop, which would otherwise impede the relative movement of the trolley and of the flank during the insertion-extraction operation.

The movement of retraction of the stops such as the stops 102, 103 is achieved using commands programmed by a control unit associated with the automatic handling device of the invention.

Figure 12:
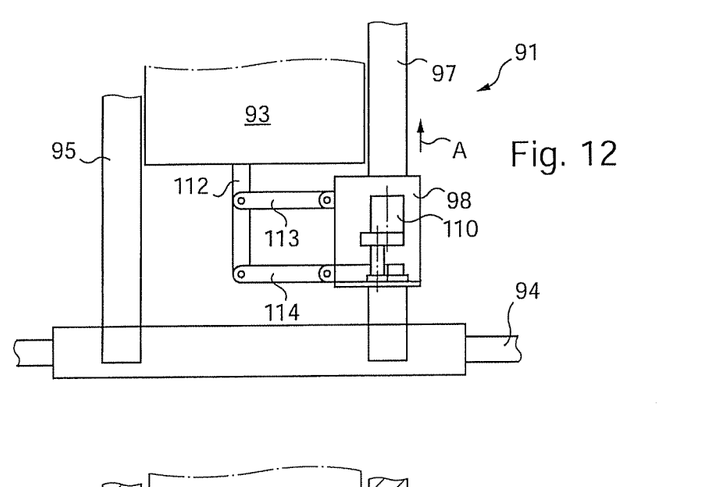
FIGS. 12 and 13 are two diagrammatic views of a pusher-extractor device of the handling basket during a phase of pushing into the handling basket in FIG. 12 and out of the handling basket in FIG. 13, a partial cross-sectional view of this same part.

FIG. 12 shows a top view of the handling basket 91 comprising the vertical plate 94 and two left 95 and right 97 side flanks. In FIG. 12, the meal distribution trolley 93 is shown in the position that it occupies when it has been installed between the side flanks on the waiting area and before the start of its transfer to the open face of a destination compartment. In a particular embodiment, a flank such as the right side flank 97 bears a drive carriage 98 which is mounted on a rail and a rack. This arrangement allows a longitudinal displacement in the direction of the arrow A of the drive carriage 98 from an insertion starting position at the level of the vertical plate 94 to a complete insertion position at the end of the flank 97 as represented in FIG. 13.

The drive carriage 98 bears a deformable parallelogram 112-114 articulated on the carriage 98. A rod 112 bears a device for linking to the meal distribution trolley for pushing or pulling the trolley 93 in the direction of the insertion or extraction movement of the trolley into or out of the compartment.

During the insertion movement the deformable parallelogram, which serves as pusher and/or extractor device, is in the contracted position, as shown in the figure. The drive carriage 98 performs its translational movement in the direction of the arrow A and the meal distribution trolley 93 is pushed upwards in FIG. 12 so that it enters the compartment through its open front face (not shown in FIG. 12).

Figure 13:
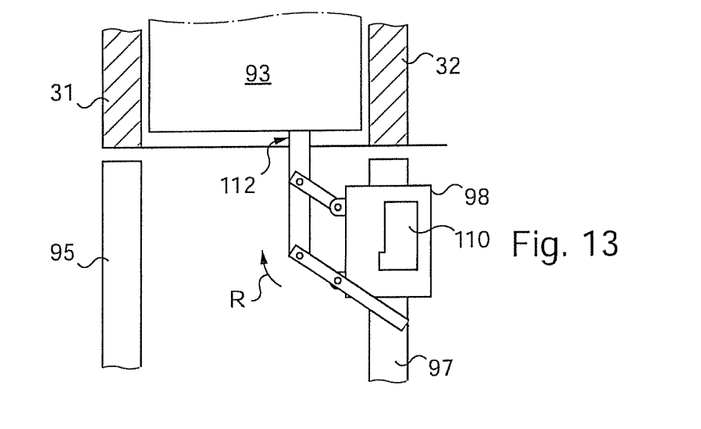

FIG. 13 shows the handling basket 91 when the meal distribution trolley 93 has been pushed and inserted completely inside the housing of the compartment comprised between the walls 31 and 32.

In order to ensure that the trolley 93 is completely contained in the compartment, the deformable parallelogram is placed, by a motor or cylinder 110, in a position or a completely extended state as represented in FIG. 13. For this purpose, the motor or cylinder 110 has a rod 112 which pushes one of the bars of the deformable parallelogram back towards the rear. The deformable parallelogram undergoes a rotation R around the axes of its bars fixed to the carriage 98 so that the end of the rod 112 associated with the trolley 93 is at its position of furthest extension.

Figure 14:
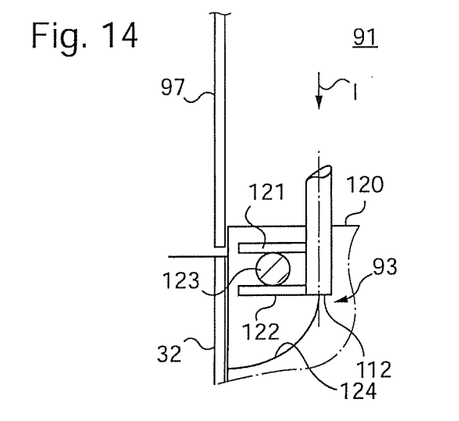
FIGS. 14 and 15 are diagrammatic cross-sectional views of two states of a key used by the pusher-extractor device of FIGS. 12 and 13.
Figure 15:
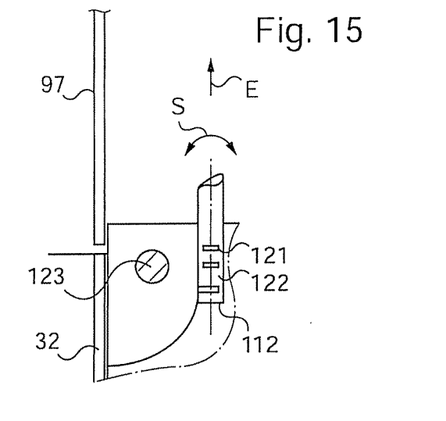

FIGS. 14 and 15 show an advantageous arrangement to be combined with the arrangement shown in FIGS. 12 and 13. In fact, FIG. 14 is a partial top view of the basket 91 during the movement of insertion I of the trolley 93 through an opening of the destination compartment of the trolley in the trolley storage cabinet.

The rod 112 at the end of the deformable parallelogram, shown as a pusher and extractor device in FIGS. 12 and 13, is equipped at its end that is in relation with the meal distribution trolley 93 with a rotating key comprising two rods 121 and 122. The rod 112 can turn about its longitudinal axis, so that the rods 121 and 122 can enter a housing 124 of the front face 120 of the trolley 93. The housing 124 contains a handle with a circular cross-section 123, used by the stewards and flight attendants to manoeuvre the meal distribution trolley in the aisle between the passengers' seats. The same handle arrangement is provided at the four corners of the meal distribution trolley. Of course, any other part projecting from the front of the meal distribution trolley can be preferred for the key mechanism.

In order to make it possible to push (I) or pull (E) the meal distribution trolley 93 through the opening of the compartment, the key 121, 122 has been turned in FIG. 14 so that the key and the handle 123 serve as fastening means between the handling basket 91 and the meal distribution trolley 93.

It will be noted that the rod can alternatively be equipped with another type of fastener intended to cooperate with a complementary fastener of the trolley 93.

FIG. 15 shows the pusher and/or extractor device when the trolley 93 has been pushed completely inside the destination compartment. The front face 34 of the destination compartment is then completely released. The final rod 112 of the pusher-extractor device, which comprises a rotating motorized mechanism, makes it possible to turn the rods 121 and 122 in the direction of the arrow S, so that the handle 123 of the meal distribution trolley is disengaged from the key 121, 122. It is then possible to carry out the withdrawal E of the deformable parallelogram which serves as pusher and/or extractor device and thus to withdraw the handling basket, the trolley 93 having been inserted completely into the destination compartment.

Of course the movement is reproduced precisely in reverse when it is desired to collect a meal distribution trolley 93 which is located in a compartment in order to place it in the waiting area.

Figure 16:
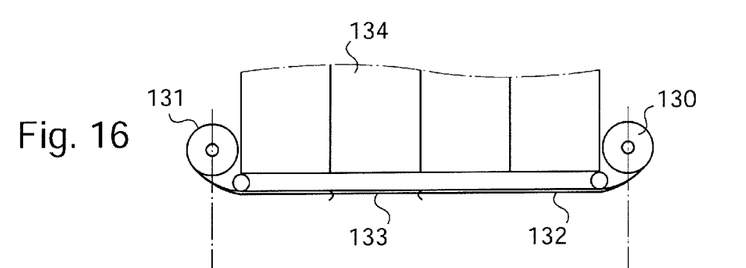
FIGS. 16 and 17 are respectively a top view and a front view of an arrangement of doors ensuring the refrigeration sealing of the storage cabinet of the invention in a particular embodiment.
Figure 17:
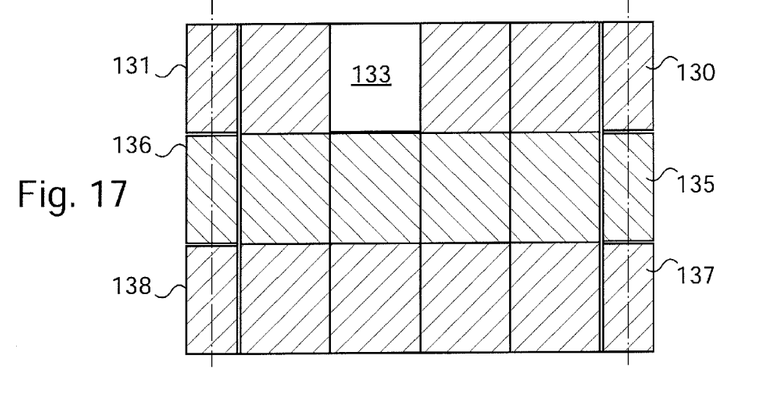

FIGS. 16 and 17 show a diagrammatic top view and a diagrammatic front view of an arrangement improving the trolley storage cabinet according to the invention.

In fact, according to the principle of the mechanism of insertion and extraction of trolleys of the invention, the front face of each compartment of the storage cabinet or of the storage unit must be completely clear in order to allow the trolley to pass through to the basket of the automatic handling device. Frequently, the trolleys contain perishable foods that it is desirable to store with refrigeration means in the trolley storage cabinet, at the very least, at a constant low temperature. For this purpose, it is desirable for all the open front faces of the compartments to be closed during the greater part of the storage time of the trolleys in the storage cabinet. It must simply be ensured that the front face of a predetermined compartment is open at the time of insertion or the extraction of a trolley in the predetermined target compartment. For this purpose, the present invention proposes an arrangement in which each level of the cabinet is associated with a roller mechanism for a removable flexible wall that on command closes or clears, one or more of the openings of the compartments. In this regard, the flexible wall comprises one or more openings which, on command, can come into position opposite the openings of the compartments. For example, each level of the cabinet is associated with a pair of rollers 130, 131 onto which is wound a thermally-insulating plastic film. The thermal film 132 has, over part of its length, a door 133 which comprises a simple opening having the precise dimension of the front, or opening, face of each compartment.

As shown in FIG. 16, the part of the film including the door is arranged in the part of the unwound film situated between the rollers 130, 131.

When it is desired to protect the compartments from the cold loss, the door 133 is displaced completely into one of the rollers 130 or 131 (the part of the film comprising the door is rolled around this roller) so that a continuous film protects the different openings of the compartments of the level on which the rollers 130, 131 are arranged.

When the control unit, for example by executing a command on a user interface input by a steward, denotes a particular address of a predetermined compartment in the predetermined level, it generates a command on the motor of at least one of the rollers 130, 131 so that the door 133 is displaced as far as the open front face of the destination compartment 134. When the meal distribution trolley has been inserted into or extracted from said compartment, the door 133 is then again retracted into one of the rollers in the storage position.

FIG. 17 shows a front view of the cabinet protected by three pairs of rollers, respectively 130, 131 on level 3, 135, 136 on level 2 and 137, 138 on level 1. Each pair of rollers can be controlled independently as a function of the destination compartment determined by the control unit.

Figure 18:
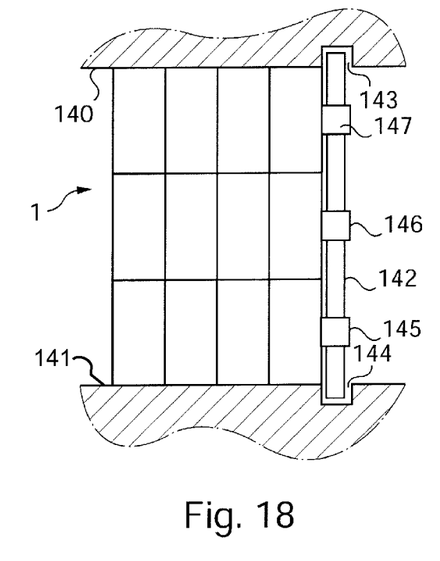
FIGS. 18 and 19 are diagrammatic views of a particular arrangement for a cabinet according to the invention.
Figure 19:
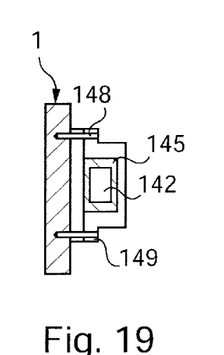

FIGS. 18 and 19 show another arrangement making it possible to increase the rigidity of the supporting structure surrounding the trolley storage cabinet according to the invention. In fact, it is possible, thanks to the arrangement of the handling basket comprising the vertical plate and the two side flanks in the automatic handling device of the invention, to reduce the quantity of material so as to increase the number of trolleys that it is possible to store in the same trolley storage cabinet. However, this saving of material makes the storage cabinet 1 more fragile than in the state of the art and it is less capable of contributing to the rigidity of the structure. In order to increase this rigidity, the present invention proposes the use of at least one rod 142, arranged between the roof section 140 of the cabin and the floor 141 of the cabin in recesses 143 and 144 provided for this purpose. The rod 142 is constituted by a single part with a rectangular cross-section as shown in FIG. 19 and which is passed through bearings 145, 146, 147 at different levels or heights of the cabinet. The same arrangement can be carried out on both sides or on a single side of the storage cabinet 1.

FIG. 19 shows a cross-sectional view at the level of one of the bearings in which there can be seen the side wall of the cabinet 1 and the actual bearing 145 which surrounds the rod having a rectangular cross-section 142. Fixings 148 and 149 are provided to connect the bearing 145 to the side wall of the storage cabinet 1. The bearing is made of a material with a low friction coefficient so as to allow the rod to slide along the cabinet.

Figure 20:
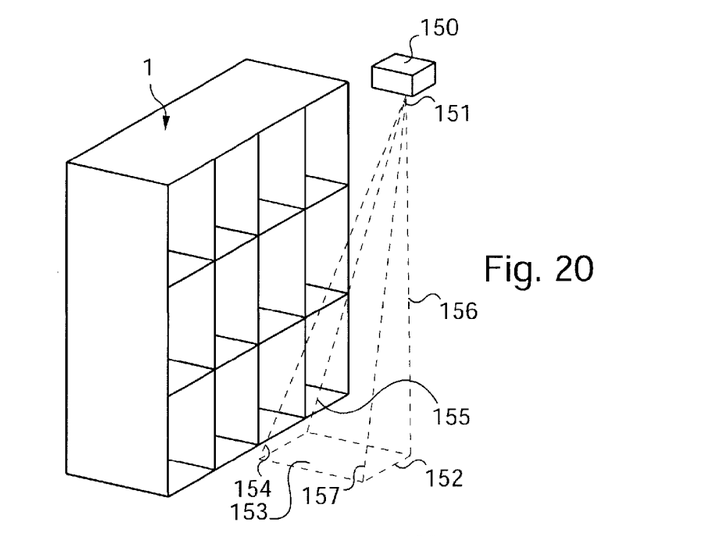
FIG. 20 is a diagrammatic perspective view of another arrangement for a cabinet according to the invention.

FIG. 20 shows another arrangement making it possible to ensure the operation of the automated cabinet according to the invention. In fact, it has been found that each trolley which is to be presented and inserted into a compartment of the cabinet 1, must be gripped by the flanks of the basket and must therefore not present too wide an angle with respect to the longitudinal general direction (depth) of the compartments. For this purpose, the invention uses a projector 150 of an optical mark. The projector comprises a lens 151 through which are beams 154-157 are emitted, producing the image of a mark 152 on the floor of the cabin in the waiting area where the meal distribution trolley is situated awaiting insertion. The mark can take the form of a rectangle of light or a marking of the four corners of the trolley on which the trolley must be positioned. During this time, the handling basket, comprising the vertical plate and the two side flanks, is removed from the waiting area into a parked or resting position (not shown in FIG. 19). The control unit of the automated handling device produces a command to switch on the projector 150 and the steward brings a trolley onto the mark 152 an orientation 153 of which is in accordance with that of the compartments. Once the trolley is arranged on the mark 152, the basket of the automatic handling device leaves its parked position in order to grip, with its two side flanks, the corresponding sides of the trolley. The movement of insertion of the trolley into a predetermined compartment of a predetermined level can then commence.

Figure 21:
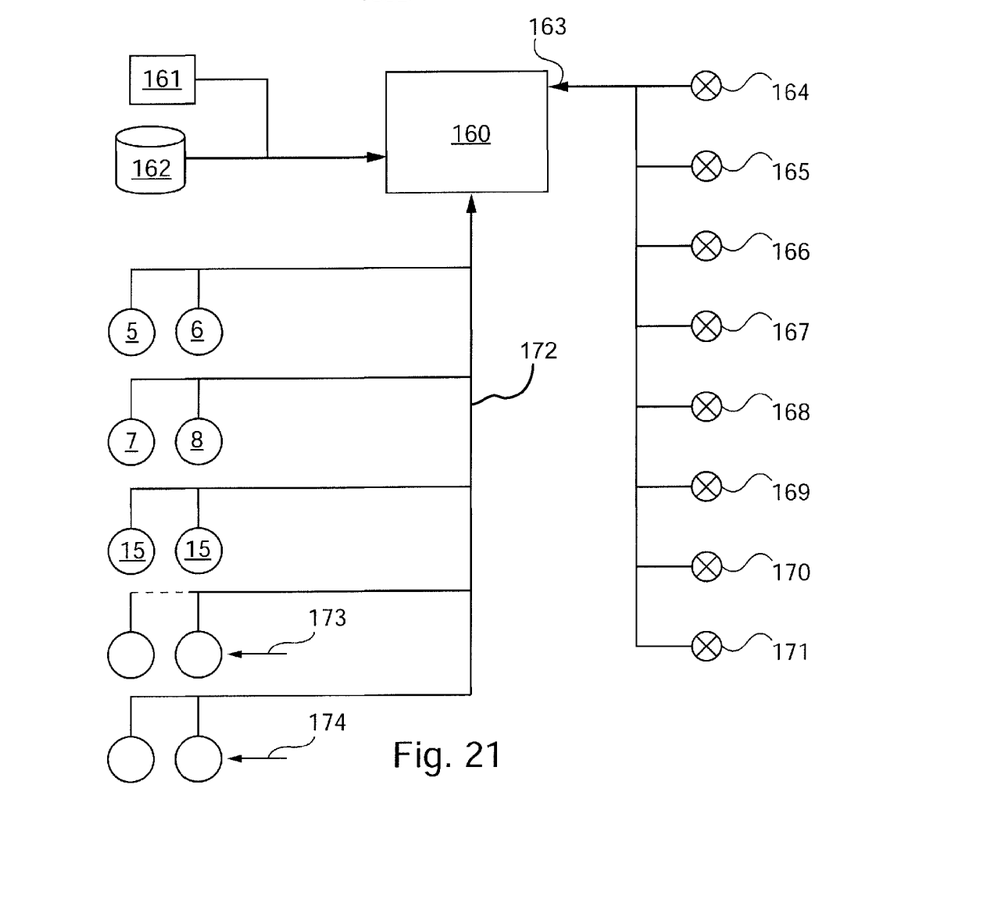
FIG. 21 is a diagram explaining the control of the automated cabinet of the invention.

FIG. 21 shows a control unit used by the automated handling device of the invention. The control unit 160 can be based on a microcomputer provided with a user interface 161 and a program memory 162. The program memory can be called by explanatory icons displayed on the user interface, which can comprise a touch screen. When the user selects an order icon, to order a type of refreshment or meal, the corresponding program in the program memory 162 is loaded into the control unit 160 and executed by the latter. It is thus possible to execute all of the operations described below. The control unit 160 is provided with means 163 for reading sensors which include:

a sensor 164 of displacement of the vertical plate of the handling basket;

a sensor 165 of the horizontal displacement of the basket constituted by the vertical plate and the two side flanks;

a sensor 166 of displacement of the side flanks on the vertical plate together;

a sensor 167 of the relative displacement of the right flank with respect to the left flank;

a sensor 168 of the relative displacement of the left flank with respect to the right flank;

a sensor 169 of displacement of the trolley between the two side flanks during the insertion of the trolley into and/or extraction of the trolley from one of the compartments;

a sensor 170 for detection of the approach of the predetermined compartment by the handling basket; and a sensor 171 of the position of the doors or openings in the flexible wall or walls on the roller mechanism of FIGS. 16 and 17.

Similarly, the control unit 160 comprises a means of control 172 of the control circuits of various motors of the handling device which have been previously described and which are principally:

the first and second motors of the vertical displacement means 5 and 6 (FIG. 1);

the motors 7 and 8:
  the gripping movements 13 and 14 of the two flanks 38 and 39 on the vertical plate 2;
  the movement 12 of displacement of the side flanks along the vertical plate together;

the motors 15 on the flanks 38 and 39 for the transfer of the trolley through a predetermined compartment of the storage cabinet;

the motors 173 for mobilization of the stops 102, 103 supporting the base of the trolley in the basket; and the motors 174 of the pusher extractor 110-112 and of the locking key 121, 122.

The invention claimed is:

1. An automated storage cabinet for at least one trolley in a supporting structure, the automated storage cabinet comprising:

at least two levels of compartments each intended for storing one trolley;

a waiting area arranged on a floor of the supporting structure and adjacent to openings of the trolley storage compartments of the automated storage cabinet;

a predetermined compartment at a predetermined level of the automated storage cabinet; and a device for automatically handling a single trolley between the waiting area and the predetermined compartment, the device for automatically handling the single trolley comprising a handling basket, the handling basket comprising:

a vertical plate perpendicular to the waiting area, vertically movable between a floor of the waiting area and any one of the levels of the automated storage cabinet; and two side flanks, connected to the vertical plate and configured to support, on either side, two opposite sides of the trolley in the waiting area and to transfer the supported trolley through an opening of the predetermined compartment, the vertical plate bearing at least one motor for producing a relative lateral displacement of the two side flanks;

wherein the device for automatically handling the single trolley is configured to carry out insertion of the trolley into the predetermined compartment or extraction of the trolley out of the predetermined compartment;

wherein the two side flanks comprise at least one motor configured to allow transfer of the trolley between a position situated between the side flanks and the predetermined compartment or vice versa, the at least one motor being configured to be actuated under control of a control unit cooperating with sensors for displacement of moving parts and for selecting a predetermined compartment; and wherein the automated storage cabinet further comprises a projector, controlled by the control unit, configured to project onto an image of a mark for alignment of a trolley on the floor in the waiting area, such that the alignment of the trolley facilitates positioning of the handling basket around the trolley.

2. The automated cabinet according to claim 1, wherein the vertical plate is mounted on at least one motor configured to confer a vertical movement upon the vertical plate.

3. The automated cabinet according to claim 2, wherein the at least one vertical movement motor of the vertical plate is duplicated on each side of the vertical plate in such a way that a control unit connected to horizontality sensors of the trolley controls horizontality.

4. The automated cabinet according to claim 2, further comprising at least one roller mechanism for a flexible wall rolled up on either side of at least one level of the compartments of the cabinet.

5. The automated cabinet according to claim 1, wherein the two side flanks comprise a plurality of removable stops for supporting, on either side, two opposite sides of a trolley, each of the removable stops being driven by a motor and being mobilized by the control unit in order to come into position under a base of the trolley during a greater part of the transfer of the trolley between the waiting area and the predetermined compartment.

6. The automated cabinet according to claim 1, wherein the two side flanks comprise a device for pushing or extracting the trolley through the opening of the predetermined compartment.

7. The automated cabinet according to claim 1, wherein the two side flanks comprise edges configured to fit parts of opposite walls of the predetermined compartment, each edge being configured to engage with a suitable profile of the part of the wall opposite the predetermined compartment.

8. The automated cabinet according to claim 1, further comprising at least one stiffening rod comprising a tube with a rectangular cross-section, connected to a side wall of the cabinet by bearings, and anchored to the floor and to a ceiling of the supporting structure of the cabinet so as to stiffen the structure.

9. An assembly comprising a floor of a supporting structure of a cabinet and an automated cabinet according to claim 1.

10. An aircraft comprising at least one automated storage cabinet for trolleys, according to claim 1.

11. An automated storage cabinet for at least one trolley in a supporting structure, the automated storage cabinet comprising:

at least two levels of compartments, each intended for storing one trolley;

a predetermined compartment at a predetermined level of the automated storage cabinet; and a device for automatically handling a single trolley between a waiting area and the predetermined compartment, the device for automatically handling the single trolley comprising a handling basket, the handling basket comprising:

a vertical plate perpendicular to the waiting area, vertically movable between a floor of the waiting area and any one of the levels of the automated storage cabinet; and two side flanks, connected to the vertical plate and configured to support, on either side, two opposite sides of the trolley in the waiting area and to transfer the supported trolley through an opening of the predetermined compartment, the vertical plate bearing at least one motor for producing a relative lateral displacement of the two side flanks;

wherein the two side flanks are configured to move independently along a horizontal dimension of the vertical plate;

wherein the device for automatically handling the single trolley is configured to carry out insertion of the trolley into the predetermined compartment or extraction of the trolley out of the predetermined compartment;

wherein the two side flanks comprise at least one motor configured to allow transfer of the trolley between a position situated between the side flanks and the predetermined compartment or vice versa, the at least one motor being configured to be actuated under control of a control unit cooperating with sensors for displacement; and wherein the automated storage cabinet further comprises a projector, controlled by the control unit, configured to project onto an image of a mark for alignment of a trolley on the floor in the waiting area, such that the alignment of the trolley facilitates positioning of the handling basket around the trolley.

* * * * *